(12) United States Patent
Mulligan et al.

(10) Patent No.: US 7,774,774 B1
(45) Date of Patent: Aug. 10, 2010

(54) SOFTWARE SETUP SYSTEM

(75) Inventors: J. Scott Mulligan, San Jose, CA (US); Benjamin Bowes Beasley, Jr., San Jose, CA (US)

(73) Assignee: Apple Inc., Cupertino, CA (US)

(*) Notice: Subject to any disclaimer, the term of this patent is extended or adjusted under 35 U.S.C. 154(b) by 1138 days.

(21) Appl. No.: 10/691,993

(22) Filed: Oct. 22, 2003

(51) Int. Cl.
*G06F 9/445* (2006.01)

(52) U.S. Cl. .............. 717/174; 717/168; 717/175; 717/176

(58) Field of Classification Search ......... 717/168–178
See application file for complete search history.

(56) References Cited

U.S. PATENT DOCUMENTS

| | | | |
|---|---|---|---|
| 4,747,040 A | | 5/1988 | Blanset et al. |
| 4,787,026 A | * | 11/1988 | Barnes et al. ............... 718/100 |
| 4,984,149 A | * | 1/1991 | Iwashita et al. ............. 711/4 |
| 5,040,110 A | | 8/1991 | Miki et al. |
| 5,131,089 A | * | 7/1992 | Cole ........................ 703/24 |
| 5,146,568 A | | 9/1992 | Flaherty et al. |
| 5,257,378 A | | 10/1993 | Sideserf et al. |
| 5,280,627 A | | 1/1994 | Flaherty et al. |
| 5,291,584 A | * | 3/1994 | Challa et al. .................. 703/24 |
| 5,325,529 A | | 6/1994 | Brown et al. |
| 5,339,430 A | | 8/1994 | Lundin et al. |
| 5,452,454 A | | 9/1995 | Basu |
| 5,454,098 A | * | 9/1995 | Pisello et al. ................ 703/24 |
| 5,459,850 A | * | 10/1995 | Clay et al. ................... 711/171 |
| 5,465,364 A | * | 11/1995 | Lathrop et al. .............. 719/321 |
| 5,483,647 A | | 1/1996 | Yu et al. |
| 5,491,813 A | * | 2/1996 | Bondy et al. ................ 719/323 |
| 5,499,378 A | * | 3/1996 | McNeill et al. .............. 703/24 |
| 5,546,585 A | * | 8/1996 | Soga ............................. 713/2 |
| 5,548,783 A | * | 8/1996 | Jones et al. .................... 710/16 |
| 5,603,011 A | | 2/1997 | Piazza |
| 5,666,293 A | | 9/1997 | Metz et al. |
| 5,694,583 A | * | 12/1997 | Williams et al. ............ 703/24 |
| 5,717,903 A | * | 2/1998 | Bonola ........................ 703/24 |
| 5,724,530 A | | 3/1998 | Stein et al. |
| 5,742,829 A | | 4/1998 | Davis et al. |
| 5,754,774 A | | 5/1998 | Bittinger et al. |
| 5,758,165 A | | 5/1998 | Shuff |
| 5,764,992 A | | 6/1998 | Kullick et al. |
| 5,784,581 A | * | 7/1998 | Hannah ..................... 710/110 |
| 5,802,297 A | | 9/1998 | Engquist |

(Continued)

OTHER PUBLICATIONS

Red Hat, Inc., "Red hat Linux 9: Red Hat Linux Customization Guide", chapter 7-8, pp. 29-68, 2003.

(Continued)

*Primary Examiner*—Lewis A Bullock, Jr.
*Assistant Examiner*—Michael Yaary
(74) *Attorney, Agent, or Firm*—Blakely, Sokoloff, Taylor & Zafman LLP

(57) ABSTRACT

Methods and apparatuses for automatic system setup. At least one embodiment of the present invention stores the setup configuration information (e.g., in files and/or in directory servers). The setup configuration information is stored (e.g., using a configuration file naming scheme) so that the configuration information for a particular machine can be found. A setup daemon on the machine searches for suitable configuration information in a number of places, such as: in a location in a local file system, in locations in mounted file volumes, and directory servers. The configuration information may be encrypted, and the setup daemon searches for the decryption key in a similar fashion.

45 Claims, 7 Drawing Sheets

U.S. PATENT DOCUMENTS

| | | | |
|---|---|---|---|
| 5,842,011 A | | 11/1998 | Basu |
| 5,859,978 A | | 1/1999 | Sonderegger et al. |
| 5,890,014 A | * | 3/1999 | Long .............................. 710/8 |
| 5,915,106 A | * | 6/1999 | Ard .............................. 703/23 |
| 5,918,048 A | | 6/1999 | Mealey et al. |
| 5,926,631 A | | 7/1999 | McGarvey |
| 5,946,469 A | * | 8/1999 | Chidester ..................... 703/24 |
| 5,948,101 A | | 9/1999 | David et al. |
| 5,953,516 A | * | 9/1999 | Bonola ......................... 703/24 |
| 5,958,020 A | * | 9/1999 | Evoy et al. ..................... 710/3 |
| 5,968,170 A | | 10/1999 | Gross et al. |
| 5,974,547 A | | 10/1999 | Klimenko |
| 6,006,029 A | * | 12/1999 | Bianchi et al. ................. 703/24 |
| 6,006,034 A | | 12/1999 | Heath et al. |
| 6,009,274 A | | 12/1999 | Fletcher et al. |
| 6,009,480 A | * | 12/1999 | Pleso ............................ 710/8 |
| 6,012,103 A | * | 1/2000 | Sartore et al. .................. 710/8 |
| 6,016,400 A | | 1/2000 | Day et al. |
| 6,016,402 A | | 1/2000 | Thomas et al. |
| 6,020,914 A | * | 2/2000 | Douhet ..................... 348/14.04 |
| 6,023,585 A | * | 2/2000 | Perlman et al. ............. 717/178 |
| 6,038,601 A | | 3/2000 | Lambert et al. |
| 6,064,566 A | * | 5/2000 | Agata et al. ................. 361/684 |
| 6,066,182 A | * | 5/2000 | Wilde et al. ................. 717/175 |
| 6,067,618 A | | 5/2000 | Weber |
| 6,073,205 A | * | 6/2000 | Thomson ..................... 711/100 |
| 6,128,734 A | | 10/2000 | Gross et al. |
| 6,130,668 A | | 10/2000 | Stein |
| 6,134,614 A | | 10/2000 | Chari et al. |
| 6,161,176 A | | 12/2000 | Hunter et al. |
| 6,163,853 A | | 12/2000 | Findlay et al. |
| 6,170,008 B1 | | 1/2001 | Bahlmann et al. |
| 6,175,917 B1 | | 1/2001 | Arrow et al. |
| 6,175,918 B1 | | 1/2001 | Shimizu |
| 6,178,503 B1 | | 1/2001 | Madden et al. |
| 6,185,678 B1 | | 2/2001 | Arbaugh et al. |
| 6,198,558 B1 | * | 3/2001 | Graves et al. ............... 398/135 |
| 6,199,204 B1 | | 3/2001 | Donohue |
| 6,202,091 B1 | | 3/2001 | Godse |
| 6,204,847 B1 | | 3/2001 | Wright |
| 6,205,473 B1 | | 3/2001 | Thomasson et al. |
| 6,209,031 B1 | | 3/2001 | Casey et al. |
| 6,209,089 B1 | | 3/2001 | Selitrennikoff et al. |
| 6,252,889 B1 | * | 6/2001 | Patki et al. .................. 370/474 |
| 6,253,209 B1 | | 6/2001 | Chase-Salerno et al. |
| 6,260,068 B1 | | 7/2001 | Zalewski et al. |
| 6,266,809 B1 | | 7/2001 | Craig et al. |
| 6,269,396 B1 | | 7/2001 | Shah et al. |
| 6,269,481 B1 | * | 7/2001 | Perlman et al. ............. 717/178 |
| 6,279,030 B1 | | 8/2001 | Britton et al. |
| 6,279,109 B1 | | 8/2001 | Brundridge |
| 6,292,941 B1 | | 9/2001 | Jollands |
| 6,314,438 B1 | | 11/2001 | Stein et al. |
| 6,317,826 B1 | | 11/2001 | McCall et al. |
| 6,330,653 B1 | | 12/2001 | Murray et al. |
| 6,330,715 B1 | | 12/2001 | Razzaghe-Ashrafi |
| 6,334,149 B1 | | 12/2001 | Davis, Jr. et al. |
| 6,345,294 B1 | | 2/2002 | O'Toole et al. |
| 6,345,309 B2 | | 2/2002 | Ohsawa et al. |
| 6,357,040 B1 | | 3/2002 | Porter |
| 6,374,363 B1 | | 4/2002 | Wu et al. |
| 6,401,093 B1 | | 6/2002 | Anand et al. |
| 6,421,777 B1 | | 7/2002 | Pierre-Louis et al. |
| 6,434,695 B1 | | 8/2002 | Esfahani et al. |
| 6,438,683 B1 | | 8/2002 | Endsley |
| 6,456,203 B1 | | 9/2002 | Shomaker et al. |
| 6,466,972 B1 | | 10/2002 | Paul et al. |
| 6,477,642 B1 | | 11/2002 | Lupo |
| 6,487,601 B1 | | 11/2002 | Hubacher et al. |
| 6,490,677 B1 | | 12/2002 | Aguilar et al. |
| 6,505,243 B1 | | 1/2003 | Lortz |
| 6,513,061 B1 | | 1/2003 | Ebata et al. |
| 6,519,633 B1 | | 2/2003 | Kubik et al. |
| 6,529,948 B1 | | 3/2003 | Bownan-Amuah |
| 6,535,976 B1 | | 3/2003 | Hoggarth et al. |
| 6,543,004 B1 | | 4/2003 | Cagle et al. |
| 6,564,232 B1 | | 5/2003 | Cole et al. |
| 6,578,069 B1 | | 6/2003 | Hopmann et al. |
| 6,606,744 B1 | * | 8/2003 | Mikurak ..................... 717/174 |
| 6,611,915 B1 | | 8/2003 | Kubik et al. |
| 6,625,754 B1 | | 9/2003 | Aguilar et al. |
| 6,631,442 B1 | | 10/2003 | Blumenau |
| 6,633,916 B2 | | 10/2003 | Kauffman |
| 6,671,748 B1 | * | 12/2003 | Cole et al. ..................... 710/8 |
| 6,718,549 B1 | | 4/2004 | Narin et al. |
| 6,728,787 B1 | * | 4/2004 | Leigh ......................... 719/327 |
| 6,735,741 B1 | | 5/2004 | Pannu |
| 6,751,658 B1 | | 6/2004 | Haun et al. |
| 6,757,706 B1 | | 6/2004 | Dong et al. |
| 6,785,885 B2 | * | 8/2004 | Norris et al. ................ 717/178 |
| 6,807,558 B1 | * | 10/2004 | Hassett et al. ............... 709/203 |
| 6,807,641 B1 | * | 10/2004 | Ishiguro et al. ................. 714/6 |
| 6,854,112 B2 | * | 2/2005 | Crespo et al. ............... 717/174 |
| 6,944,185 B2 | * | 9/2005 | Patki et al. .................. 370/474 |
| 6,944,857 B1 | * | 9/2005 | Glaser et al. ................ 717/173 |
| 6,976,057 B2 | | 12/2005 | Yoshiasa |
| 6,976,252 B2 | * | 12/2005 | White et al. ................. 717/174 |
| 6,996,076 B1 | * | 2/2006 | Forbes et al. ................ 370/310 |
| 7,076,774 B2 | * | 7/2006 | Chrysanthakopoulos et al. ......................... 717/153 |
| 7,089,551 B2 | * | 8/2006 | Fordemwalt et al. ........ 717/174 |
| 7,089,553 B1 | * | 8/2006 | Glaser et al. ................ 717/178 |
| 7,249,354 B2 | * | 7/2007 | Tigani et al. ................ 717/177 |
| 2003/0088716 A1 | | 5/2003 | Sanders |
| 2006/0206450 A1 | | 9/2006 | Fletcher et al. |
| 2008/0209410 A1 | | 8/2008 | Demsky et al. |

OTHER PUBLICATIONS

Apple Computer, Inc., "Getting Started with Mac OS X Server: includes installation and setup information for Mac OS X Server version 10.2", pp. 1-24, 2002.

"Device Configuration Assistant Design Overview" Sun Microsystems, 1999 (8 pages).

"Etherboot," downloaded from www.slug.org.au/etherboot/ on Oct. 11, 1999, 4 pages.

"Netboot Introduction", Downloaded from www.han.de/.about.gero/netboot/english/introduction.html on Oct. 11, 1999, 13 pages.

Alexander, S. "HDCP Options and BOOTP Vendor Extensions" Network Working Group, RFC 2132, Mar. 1997 (34 pages).

Arbaugh, William A., et al. "A Secure and Reliable Bootstrap Architecture" IEEE Symposium on Security and Privacy, May 4-5, 1997, pp. 65-71.

Burke, Michael G. et al., "The Jalapeno Dynamic Optimizing Compiler for Java™," IBM Thomas J. Watson Research Center, 1999 (14 pages).

Campbell, Andrew T. et al., "A Survey of Programmable Networks," 1999.

Chuang, Shaw-Cheng et al., "A Case Study of Secure ATM Switch Booting," IEEE 1996 (10 pages).

Croft, Bill and Gilmore, John. "Bootstrap Protocol (BOOTP)" Network Working Group RFC 951, Sep. 1985 (12 pages).

Davidson, Rusel and MacKinnon James G., "Bootstrap Tests: How Many Bootstraps?" Jun. 1998 (15 pages).

Estrin, Deborah et al. "A Dynamic Bootstrap Mechanism for Rendezvous-Based Multicast Routing" IEEE INFOCOM '99. Eighteenth Annual Joint Conference of the IEEE Computer and Communications Societies. vol. 3, Mar. 21-25, 1999, pp. 1090-1098.

Ford, Bryan et al. "The Flux OS Toolkit: Reusable Components for OS Implementation" IEEE May 5-6, 1997, pp. 14-19.

Ford, Bryan et al., "The Flux OS Kit: A Substrate for Kernel and Language Research," 1997 (15 pages).

Hesterberg, Tim C., "Bootstrap Tilting Interference and Large Data Sets- Proposal to NSF SBIR Program," Jun. 11, 1998, pp. 2-22.

Hobbs, M.J. et al., "Booting of the RHODOS Distributed Operating System," Sep. 8, 1984 (18 pages).

Kaszeta, Rich "A New Use for Old and Outdated PC's," Downloaded from www.menet.umn.edu/˜kaszeta/unix/xterminal/index.html on Oct. 11, 1999, 8 pages.

Reynolds, J. "BOOTP Vendor Information Extensions" Network Working Group RFC 1395, Jan. 1993 (8 pages).

Uhlig, Richard et al., "Trap-Driven Simulation with Tapeworm II," *6th Int. Conf. Architectural Support for Programming Languages and Operating Systems (ASPLOS-VI)*, Oct. 1994, pp. 1-13.

Wimer, W. "Clarifications and Extensions for the Bootstrap Protocol" Network Working Group, RFC 1532, Oct. 1993 (22 pages).

Wong, P.K. "Remote Boot Windows 95a Step by Step Instructions," Downloaded from wpkgate.kc.com.my/remoteboot/win95.text on Oct. 11, 1999, 5 pages.

\* cited by examiner

SOFTWARE SETUP SYSTEM

FIELD OF THE TECHNOLOGY

The technology relates generally to software setup for data processing systems.

BACKGROUND

It is typical for a data processing system to require a certain amount of initial setup to be performed before the system can be utilized. For example, a typically operating system requires basic information such as: language preferences, keyboard type, system administrator's account and password, current date and time, network address, hostname, the software license key for the operating system, and the optional services that shall be turned on when the operating system starts, such as email, printer, and web services.

It is typical for a computer system to require that this type of configuration information be provided before the system can be used. The process for providing this information usually requires a person to enter the information using a keyboard at the time the computer system is booted for the first time after the operating system is installed (or reinstalled). Once the operating system is configured, subsequent rebooting of the system will not require this data, as the setup information has already been applied.

The process of supplying this configuration information can be tedious and duplicative, especially when managing a large number of computers. Further, installation of an operating system on one computer may need to be performed repeatedly. For example, it may be desirable to reinitialize a computer to have a fresh installation of an operating system after certain uses of the computer. Further, when configuring a large number of computers, similar data often need to be provided to each of the computers for the initial setup.

Thus, many system administrators would prefer to use an automated method to install the operating system. For example, Red Hat Linux provides a kickstart installation method for the automated installation. Kickstart installation uses a kickstart file which is a simple text file containing a list of items that provides the information required for the installation. The kickstart file may be created by editing a copy of an existing kickstart file using a text editor, by running a Kickstart Configurator application, or by writing it from scratch. The administrator specifies the location of the kickstart file (e.g., a boot diskette, a Boot CD-ROM, a Network File System (NFS) volume, a HyperText Transfer Protocol (HTTP) directory, or a local file system) to begin a kickstart installation. The installation program uses the information in the kickstart file at the specified location to complete the installation without further user input.

SUMMARY OF THE DESCRIPTION

Methods and apparatuses for automatic system setup are described here. Some of the embodiments of the present invention are summarized in this section.

At least one embodiment of the present invention stores the setup configuration information (e.g., in files and/or in directory servers). The setup configuration information is stored (e.g., using a configuration file naming scheme) so that the configuration information for a particular machine can be found among those for various different machines. A setup daemon/process on the machine automatically searches for suitable configuration information in a number of places, such as in a location in a local file system, in locations in mounted file volumes, and in one or more directory servers. In the event the configuration information is encrypted, the setup daemon/process automatically searches for the corresponding decryption key in a similar fashion.

In one embodiment of the present invention, a method to set up software installed on a storage device of a data processing system includes automatically searching in a plurality of locations for configuration information and setting up the software installed on the storage device of the data processing system using first configuration information found in at least one of the plurality of locations. In one example, the first configuration information includes a decryption key and encrypted configuration information decryptable with the decryption key. The decryption key and the encrypted configuration information are found in different locations among the plurality of locations. In one example, the plurality of locations are periodically searched. In one example, the plurality of locations include: a default location on a storage device attached fixedly and locally to the data processing system, a location in a removable device (e.g., a firewall drive, or a removable medium, such as a floppy diskette or a CD-ROM) locally attached to the data processing system, and a remote location accessible to the data processing system through a network connection (e.g., a directory server). In one example, the software is a portion of an operating system of the data processing system, and the configuration is performed as an initial setup for the operating system. In one example, a plurality of identifications of the data processing system are determined (e.g., a network address of the data processing system, a hostname of the data processing system, a hardware serial number of the data processing system, a hardware address of a network interface device of the data processing system, and others), and the search uses the plurality of identifications to find configuration information suitable for the data processing system.

In one embodiment of the present invention, a method to set up software for a data processing system includes querying a directory server to obtain configuration information (e.g., user account information, time zone information, keyboard information, a default language, a license key for the software and others) and setting up the software for the data processing system using the configuration information obtained from the directory server. In one example, the software is a portion of an operating system of the data processing system, and the operating system is set up for initial use. In one example, a network address and an address of the directory server is automatically obtained from a server (e.g., a DHCP server) on a local area network, a network interface device of the data processing system is then configured to use the network address, and querying the directory server uses the address of the directory server and the network interface device, which is configured to use the network address. In one example, the configuration information includes information specifying whether one or more services of the operating system (e.g., email, printer, firewall, web, and others) shall be provided on the data processing system.

In one embodiment of the present invention, a method to set up software installed on a data processing system includes: automatically searching for encrypted configuration information; determining a decryption key to decrypt the encrypted configuration information; and setting up the software with the decryption key and the encrypted configuration information. In one example, the decryption key is communicated from a remote data processing system to the data processing system, and the decryption key is not stored on a file system of the data processing system. In one example, the decryption key is determined from searching in a plurality of locations (e.g., a removable storage device locally attached to the data processing system, a predetermined location in a file volume in a file system of the data processing system, a database on a remote directory server system accessible to the server system through a network connection, and others).

In one embodiment of the present invention, a method to configure software installed on a data processing system includes periodically searching for first configuration information; and configuring the software installed on the data processing system using the first configuration information when the first configuration information is found. In one example, the first configuration information is encrypted, and the first configuration information is found in a remote location accessible to the data processing system through a network connection (e.g., in a database, such as a directory server).

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to "one embodiment" or "an embodiment" in the present disclosure are not necessarily references to the same embodiment, and such references mean at least one.

At least one embodiment of the present invention seeks to store the configuration information so that an automated search process can potentially discover the configuration information and automate the software configuration process.

Figure 1:
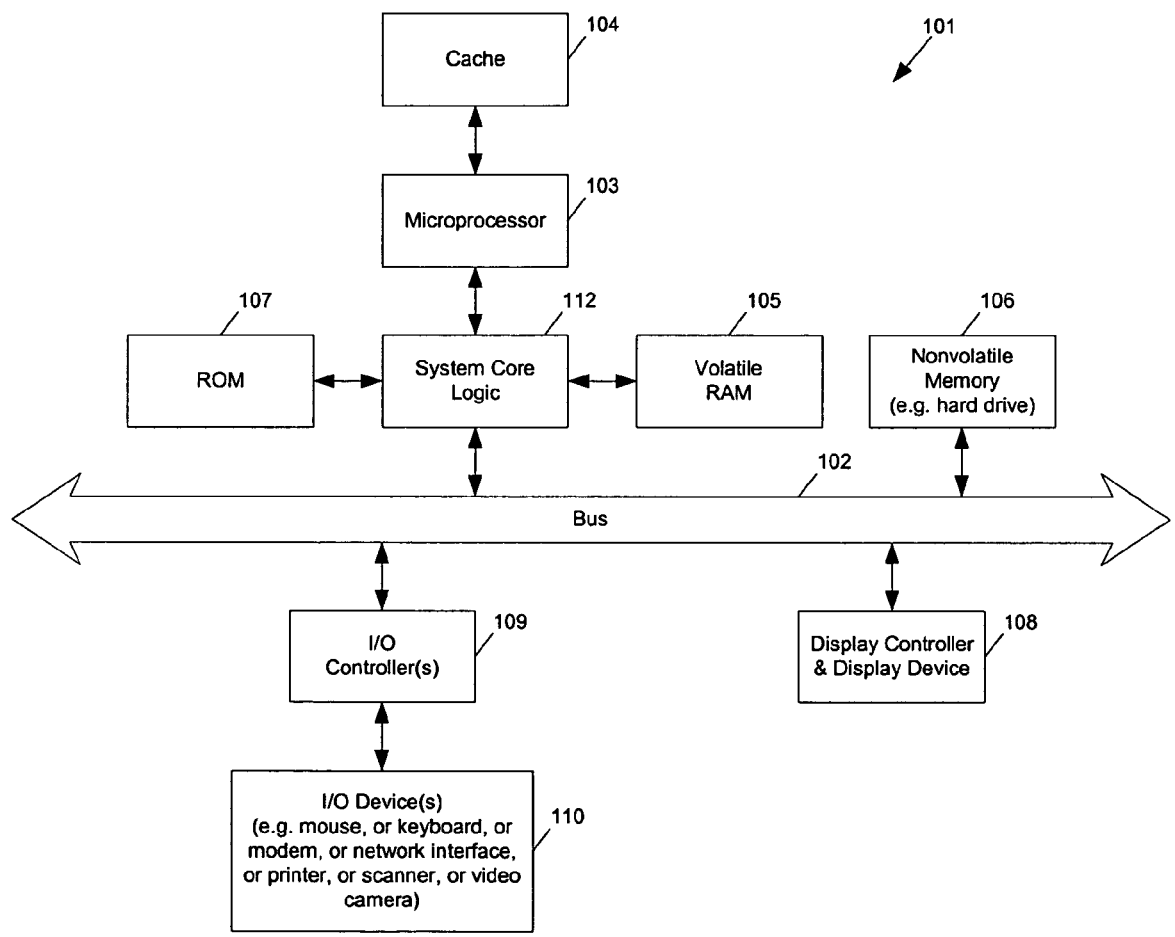
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 1 may, for example, be an Apple Macintosh computer.

As shown in FIG. 1, the computer system 101, which is a form of a data processing system, includes a bus 102 and system core logic 112 which interconnect a microprocessor 103, a ROM 107, and volatile RAM 105 and a non-volatile memory 106. The microprocessor 103, which may be, for example, a G3 or G4 or G5 microprocessor from Motorola, Inc. or IBM is coupled to cache memory 104 as shown in the example of FIG. 1. The bus 102 and system core logic 112 interconnect these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 102 may include one or more buses connected to one another through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In one embodiment of the present invention, the configuration information is stored as a file in a file system, or as an entry in a database (e.g., a record on a directory server). An application program may be used to collect and save the configuration information into a file or in a directory server. The configuration information can be saved as clear data without encryption, which can be easily edited using a text editor. Alternatively, the application program may further encrypt the configuration information (e.g., for storage in the directory server) so that confidential information, such as user accounts and passwords, are protected against unauthorized access. To facilitate the automated search and easy management of the configuration data for a number of computers, the storing of the configuration data can be associated with the identification information of the corresponding computers, such as the hostname of a computer, the Internet Protocol (IP) address and the Media Access Control (MAC) address of a network interface device of the computer, and a hardware serial number of the computer. More details are described below.

In one embodiment of the present invention, different portions (e.g., user account information and license keys) of the configuration information can be stored in different files and directory service records. The information found in different files and records are combined (e.g., based on a priority scheme) when applied to the configuration process. For example, the file associated with a hardware serial number of a computer is intended only for the computer with this hardware serial number, and, data in a generic entry at a directory server can be applied to any computer. When certain data is missing from the file associated with the hardware serial number of the computer, the corresponding data in the generic entry in the directory server can be used.

Figure 2:
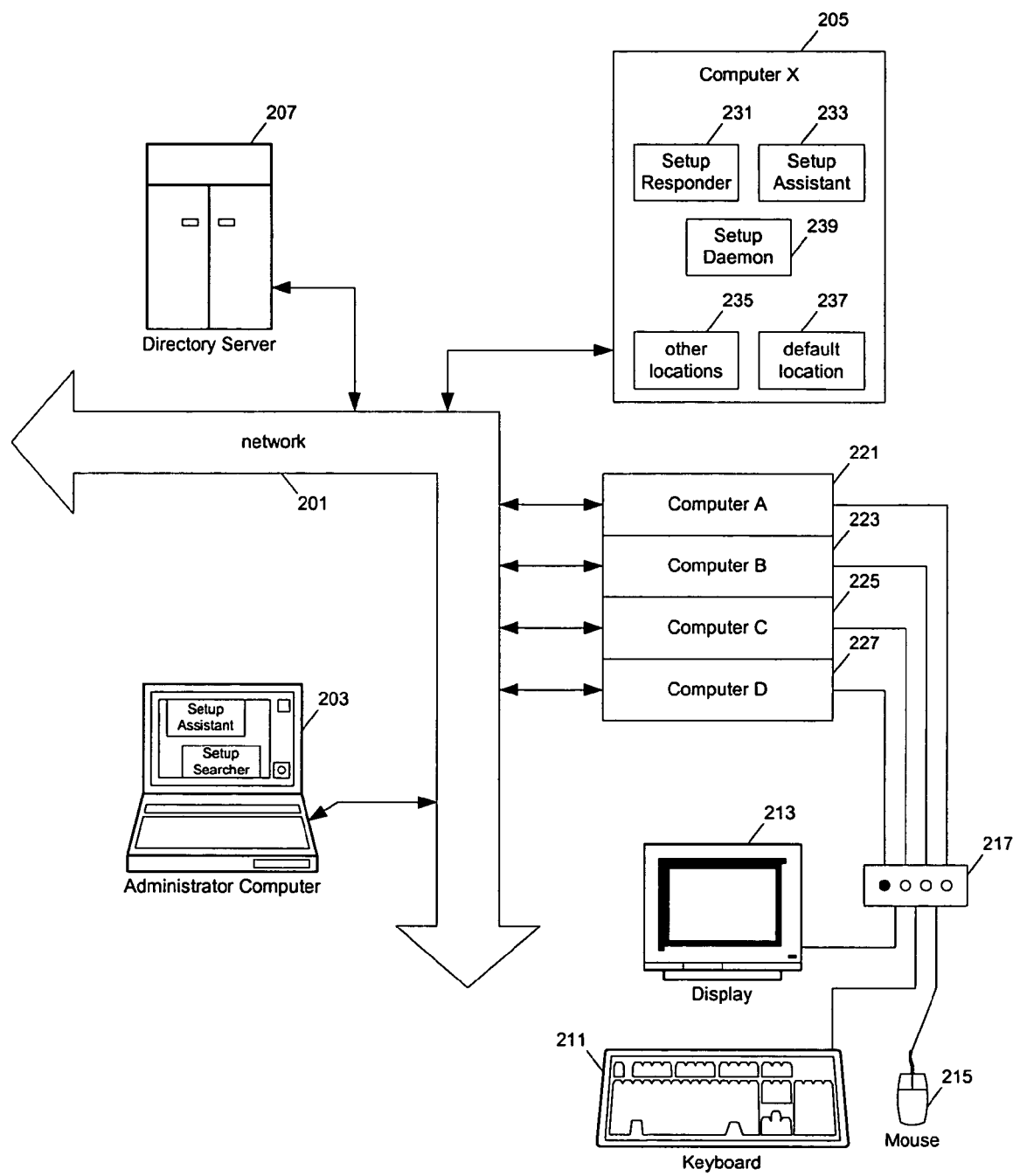
FIG. 2 illustrates providing configuration information for operating system setup which may be used in various embodiments of the present invention.

FIG. 2 illustrates methods of providing configuration information for operating system setup which may be used in various embodiments of the present invention. In FIG. 2, computer X (205) may be a computer that is to be set up. Setup assistant 233 provides a user interface for a user to enter the configuration information interactively into computer 205. After setup assistant 233 collects all the necessary information, the collected configuration information may be written into default location 237 on computer 205. Once the configuration information is present in default location 237, a configurator (a running software module) starts to set up the operating system using the configuration information in the default location. In one embodiment of the present invention, the setup assistant can also store the configuration information in other locations 235, which can be specified by the user. For example, the configuration information may be stored on a hard drive or a removable medium, such as a floppy diskette, a ZIP diskette, an IEEE 1394 compatible drive (a disk drive attachable to a data processing system through an IEEE-1394 port), a flash memory device, etc. Once the configuration information is stored, it can be used for setup during reinstallation or for modification for another computer.

In one embodiment, an administrator computer can be used to set up a target computer through the network. For example, when target computer 205 is in the setup process, setup responder 231 can run as a daemon process to listen to the network 203 for a broadcast message from a setup searcher running on administrator computer 203. The setup assistant on administrator computer 203 can find out the computers on the network that need to be set up using setup searcher (e.g., a separate process or a module of setup assistant). The setup searcher broadcasts a message on the subnet to look for a list of computers that are in the setup process. In response to the message from the setup searcher, the setup responder sends a message to the setup searcher. The message from the setup responder includes identification information of the target computer (e.g., the IP address, the MAC address and the hostname) and other information indicative of the status of the installation and/or setup process. Note that the IP address of the target may be configured through a DHCP server, or through a self-assigning process (e.g., selecting one IP address from a class of IP network address, checking it for any conflict on the subnet, and using it if there is no conflict). The setup searcher presents the list of target computers that responded to the broadcast message to the setup assistant. The administrator can then select one target computer for remote configuration. If the administrator knows the identification information of the target computer, the administrator can also directly ask the setup assistant to set up the target computer. Once the administrator enters the configuration for the target computer on the administrator computer, the setup assistant on the administrator computer places the configuration information in a configuration file on the default location (e.g., 237) on the target computer. For example, the during the setup process, a password for accessing a file on the target computer can be automatically set to a value known to the administrator (e.g., the hardware serial number of the target computer). The setup assistant can then use the password to copy the configuration file from the administrator computer to the target computer (e.g., using Secure Copy (scp), which provides encrypted file transfer of data over insecure networks).

Alternatively, when computer 205 needs setup configuration information, it may also run setup responder 231 to communicate with a remote administrator computer through a network for remote setup. For example, setup responder 231 may broadcast, on a subnet, a request for a remote setup assistant to collect the configuration information on behalf of computer 205. To remotely set up computer 205 from administrator computer 203, one can start a setup assistant on administrator computer 203 on the subnet to target computer 205 for remote setup. In response to the request for a remote setup assistant from computer 205, the setup assistant on administrator computer 203 establishes communication with setup responder 231 for remote setup. In one embodiment, setup responder 231 requires the remote setup assistant to submit a correct password (e.g., the hardware serial number of computer 205) from the administrator computer to allow the administrator computer to remotely set up computer 205. After the communication between administrator computer 203 and target computer 205 is established for remote setup, one can use the user interface of administrator computer 203 to collect the configuration information for target computer 205. In one embodiment, after the setup assistant of administrator computer 203 communicates the configuration information to setup responder 231 of target computer 205, setup responder 231 writes the configuration information into a file in default location 237, so that the setup program can use the configuration information to perform the initial setup of the operating system.

Setup daemon 239 on the target computer monitors default location 237 for a configuration file. If a configuration file is found at the default location, the setup process can configure the target computer according to the parameters in the configuration file. In one embodiment of the present invention, setup daemon 239 not only monitors the default location for the configuration file but also searches for configuration information at other locations. For example, setup daemon 239 may search locations 235 in the target computer (such as directories or folders in mounted volumes of the target computer) and locations in the other computers (such as directory server 207, or other type of databases).

In one embodiment of the present invention, the setup assistant of administrator computer 203 can collect the configuration for a target computer without performing the remote setup. The collected configuration information for the target computer is stored into a file (e.g., on a removable medium) or as a record on directory server 207.

One may modify the configuration information of one computer (e.g., computer 205) to generate configuration information for other computers (e.g., computers 221-227). For example, computers A-D (221-227) can be rack-mount servers that do not have displays and input devices attached to them individually. Some server computers do not have displays and input devices (e.g., keyboard and mouse), and some server computers share displays and input devices. For example, a Keyboard, Video and Mouse (KVM) Switch (217) may be used to selectively couple display 213, keyboard 211 and mouse 215 to one of computers 221-227. It is generally a time consuming task to provide configuration information individually through the input devices (e.g., keyboard 211 and mouse 215). In one embodiment of the present invention, after the configuration files are generated (e.g., through the use of a set up assistant, or through modifying an existing copy of the configuration file), the configuration information can be maintained at a number of locations. A computer in need of configuration information (e.g., servers 221-227) can then automatically search for the suitable configuration information to automate the configuration process. Since the computer can search in a plurality of locations automatically, it is not necessary to specify a location to the configurator manually. Thus, the task of managing system configuration can be greatly simplified, especially for a large number of computers.

Figure 3:
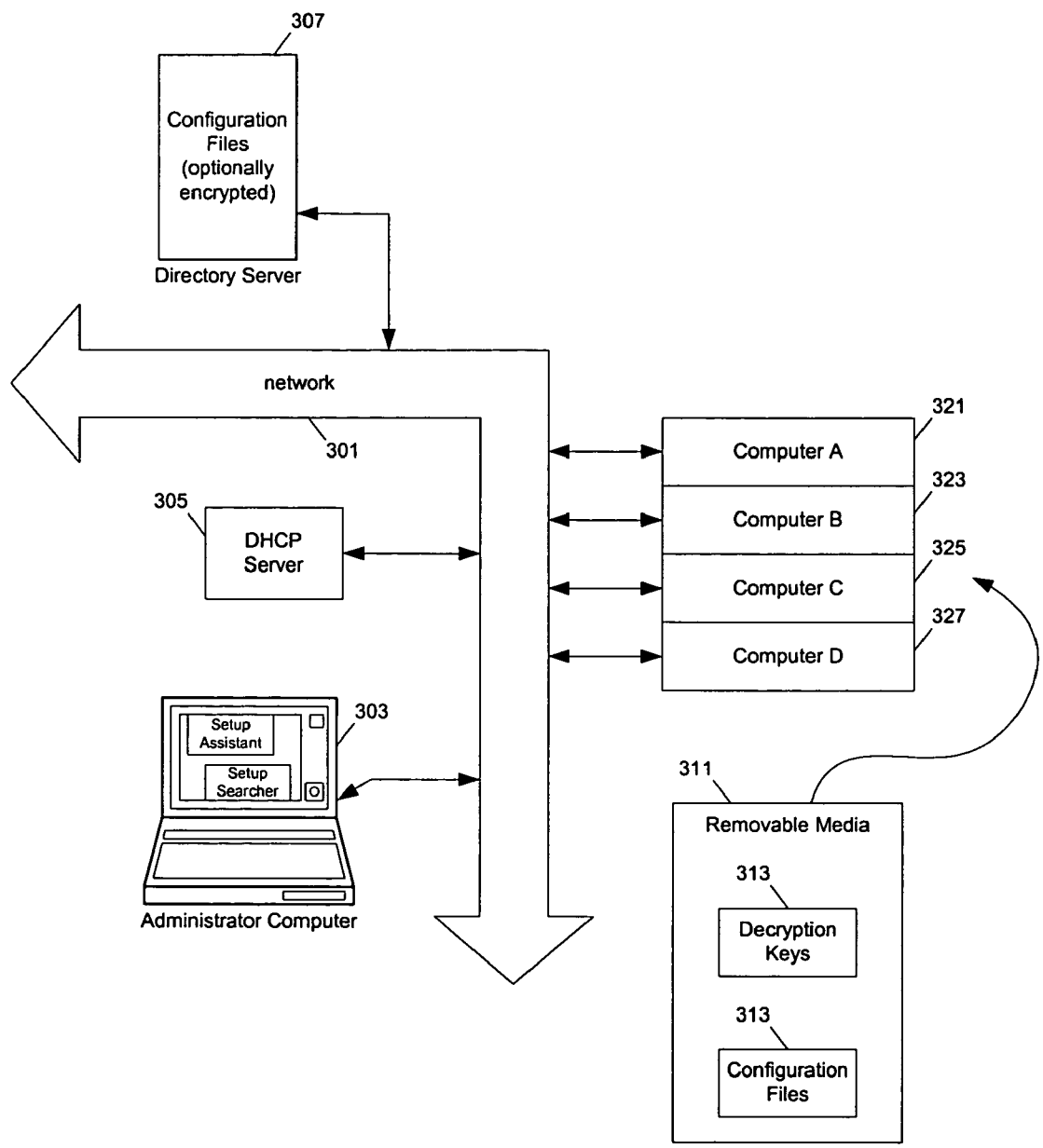
FIG. 3 illustrates automatically configuring an operating system according to various embodiments of the present invention.

FIG. 3 illustrates methods to automatically configure an operating system according to various embodiments of the present invention. In one embodiment of the present invention, a computer (e.g., 321-327) can determine a number of identifications for itself, such as hardware serial number, IP address, hostname, a hardware address (e.g., MAC address) of a network interface device and others (e.g., an identification assigned specifically for the purpose of configuration). Some of the identifications (e.g., hardware serial number, IP address, hostname, MAC address) can be uniquely associated with the individual devices to be set up. Other identifications (e.g., subnet mask, or "generic" which matches any computer) can be associated with a group of computers. In one embodiment of the present invention, the identifications that may match more than one computer have low priorities in searching and applying the configuration information, and the unique identifications have high priorities. Further, the configuration files associated with the unique identifications can be used to overwrite certain information in the configuration files associated with non-unique identifications. Thus, a generic configuration file can have the common configuration information, and the specific configuration file may only contain the configuration information that is unique to the target computer. Thus, a large number of configuration files can be easily maintained for a large of number computers.

A hardware serial number is typically stored on a non-volatile memory of a computer (e.g., a ROM of the computer). The hardware serial number can be used to uniquely identify the computer. A MAC address may also be used to uniquely identify the computer. However, it is understood that a computer may have a number of network interface devices and thus a number of different MAC addresses. Further, a network interface device may be a removable device (e.g., a PCMCIA network card, or a network device attachable to a USB port). Based on the MAC addresses, a Dynamic Host Configuration Protocol (DHCP) server can be configured to assign predetermined IP addresses to the corresponding computers. Alternatively, the DHCP server can be configured to sequentially assign a list of IP addresses to a number of computers, which are configured one after another. A DHCP server can also provide various network configuration information, such as the IP addresses of Domain Name System (DNS) servers and Network Information Service (NIS) servers. Using the IP address, a computer can further determine its hostname through querying the DNS servers. Alternatively, the hostname, IP address and other identifications for the computer can be provided in a configuration file in a local file system of the computer (e.g., on a hard drive, a removable device, such as an IEEE 1394 compatible drive, a floppy diskette, or a CD-ROM). Further, these identifications can be obtained through a remote setup assistant (e.g., on a computer 303 attached to the same subnet of the computer that is to be configured) during the installation process or during the configuration process. In one embodiment of the present invention, at least one network interface device is configured during the remote installation of the operating system for the computer. Thus, after the installation, the identification information is available to the computer for initial setup. Once the identifications for the computer are determined, configuration information can be further searched based on these identifications.

In one embodiment of the present invention, the configuration information can be maintained in a number of locations, and a daemon process runs in the background to automatically search for the configuration information in various locations. For example, configuration files for various computers can be stored on removable media 311 (e.g., an IEEE 1394 compatible drive, a floppy diskette, or a CD-ROM). The configuration files have a naming system so that the configuration files for a specific computer can be identified and retrieved using the identification information of the computer. Since a computer may have a number of different identifications, the daemon process searches for applicable configuration files according to the priorities associated with the identifications. For example, when the computer has a hardware serial number, the configuration file with a name that matches the hardware serial number has a high priority.

In one embodiment of the present invention, a configuration file is designed to contain all the configuration information required to complete the setup process. Thus, once a configuration file is found (e.g., a file that matches the hardware serial number), no further search is necessary. Alternatively, portions of the configuration information may be distributed in a number of different configuration files. A configuration file may contain only a portion of the configuration information, and the daemon process continues the search until all required configuration information is found. For example, a configuration file associated with an identification that matches a group of computers (e.g., the subnet address, or a file that matches all the computers) can be used to store all the common information for the configuration process. A configuration file that is uniquely associated with the identification of one computer (e.g., the hardware serial number) can be used to provide the configuration information unique to the computer (e.g., hostname and software license key). Further, the configuration information may further be grouped in portions (e.g., selection of optional services, configuration parameters specific for one service, and others) so that different portions of the configuration information may be specified in different configuration files. In one embodiment, the configuration information for setting up a server computer includes the information for setting up programs and services such as AFP (Apple File Protocol), FTP (File Transfer Protocol), print server, NetBoot, web server (e.g., Apache), WebDAV (WWW Distributed Authoring and Versioning), NTP (Network time protocol) client, NTP server, QTSS (Quicktime Streaming Server), mail, SMB (Server Message Block, e.g., Samba), LDAP (Lightweight Directory Access Protocol) client, LDAP server, NetInfo client, password server, watchdog and others. Through the search process, the daemon process may collect and copy the configuration information into a configuration file at the default location.

In one embodiment of the present invention, the configuration files at the default location may be created in a number of ways. For example, the local interactive setup assistant or the local setup responder in communication with a remote setup assistant may save a configuration file at the default location. The daemon process may search and copy configuration files from various other locations to the default location. Alternatively, the local interactive setup assistant can be configured to save the configuration files in different locations, from where the daemon process may discover and copy the suitable configuration information to the default location.

In one embodiment of the present invention, the daemon process searches predetermined locations in all mounted file volumes. A file volume is typically a set of files stored in a hierarchical fashion in an individual storage medium (e.g., files, directories, or folders in other directories or folders). For example, the files in a removable medium (e.g., an IEEE 1394 compatible drive, a floppy diskette, a CD-ROM) are typically mounted as a file volume (e.g., as a directory tree in the root files system in Mac OS X available from Apple Computer, Inc. or in a similar-style operating system, or as a logical drive in a Microsoft Windows operating system). The files on a large capacity hard drive may be mounted as a single file volume or partitioned and mounted as multiple file volumes. In one embodiment, the daemon process searches in a predetermined location (e.g., directory (or folder) "Auto Server Setup") in each of the mounted file volumes in the computer system. For example, if a file volume is mounted at the directory "/volumes/Volume Name", the daemon process searches the directory "/Volumes/Volume Name/Auto Server Setup/" for matched configuration files. When a removable storage device (e.g., an IEEE 1394 compatible drive, or a CD-ROM) is attached to the computer, the computer automatically mounts the file volume for the storage device (e.g., mounted at "/Volumes/removable drive"). Then, the corresponding location (e.g., "/Volumes/removable drive/Auto Server Setup/") in the local storage devices is searched to find suitable configuration files. In one embodiment of the present invention, the computer may also automatically mount any available network file volumes (e.g., on a local area network) and search the configuration information in the mounted network file volumes. In addition to the file volumes mounted in the file system of the computer, the computer may further search in one or more databases accessible to the computer through a network (e.g., directory server 307 or other network resources, such as an HTTP server). The addresses of the network resources can be specified in a configuration file in the file system or through other servers, such as a DHCP server). A directory server provides directory services by sending data entries to a client in response to a query from the client. A directory server may communicate with a client in a standard protocol such as Lightweight Directory Access Protocol (LDAP). Alternatively, an Active Directory server or other type of directory server that uses other communication protocols may also be used to provide the directory service. Configuration information may also be retrieved from a web server using an HTTP protocol. The address of the web server can be provided to the computer as the default World Wide Web (WWW) server by a DHCP server (or in a configuration file).

A configuration file may contain confidential information, such as user accounts and passwords. Thus, a configuration file may be encrypted. For example, the configuration file stored on the directory server (e.g., 307) can be encrypted and a decryption key can be stored separately in a different configuration file in a better-guarded location (e.g., removable media 311). Alternatively, the decryption key can be supplied to the computer remotely from a setup assistant running on a remote computer through a network connection. For example, the remote setup assistant may receive the decryption key from the user input device at the administrator computer, communicate the decryption key to the setup responder, which decrypts an encrypted configuration file using the decryption key without storing the decryption key in the file system. In one embodiment of the present invention, the decryption key may also be automatically found by searching in a plurality of locations in a similar fashion.

Some databases (e.g., directory server 307) may not accept binary data as an entry. Thus, the binary information (e.g., the encrypted content of a configuration file) may be encoded as ASCII data for storage in the database. The ASCII data entry can be subsequently decoded after the retrieval to obtain the original binary data (e.g., the encrypted content of the configuration file). It is understood that any methods known in the field for converting between a binary format and an ASCII format and for encryption and decryption can be used with the present invention.

Figure 4:
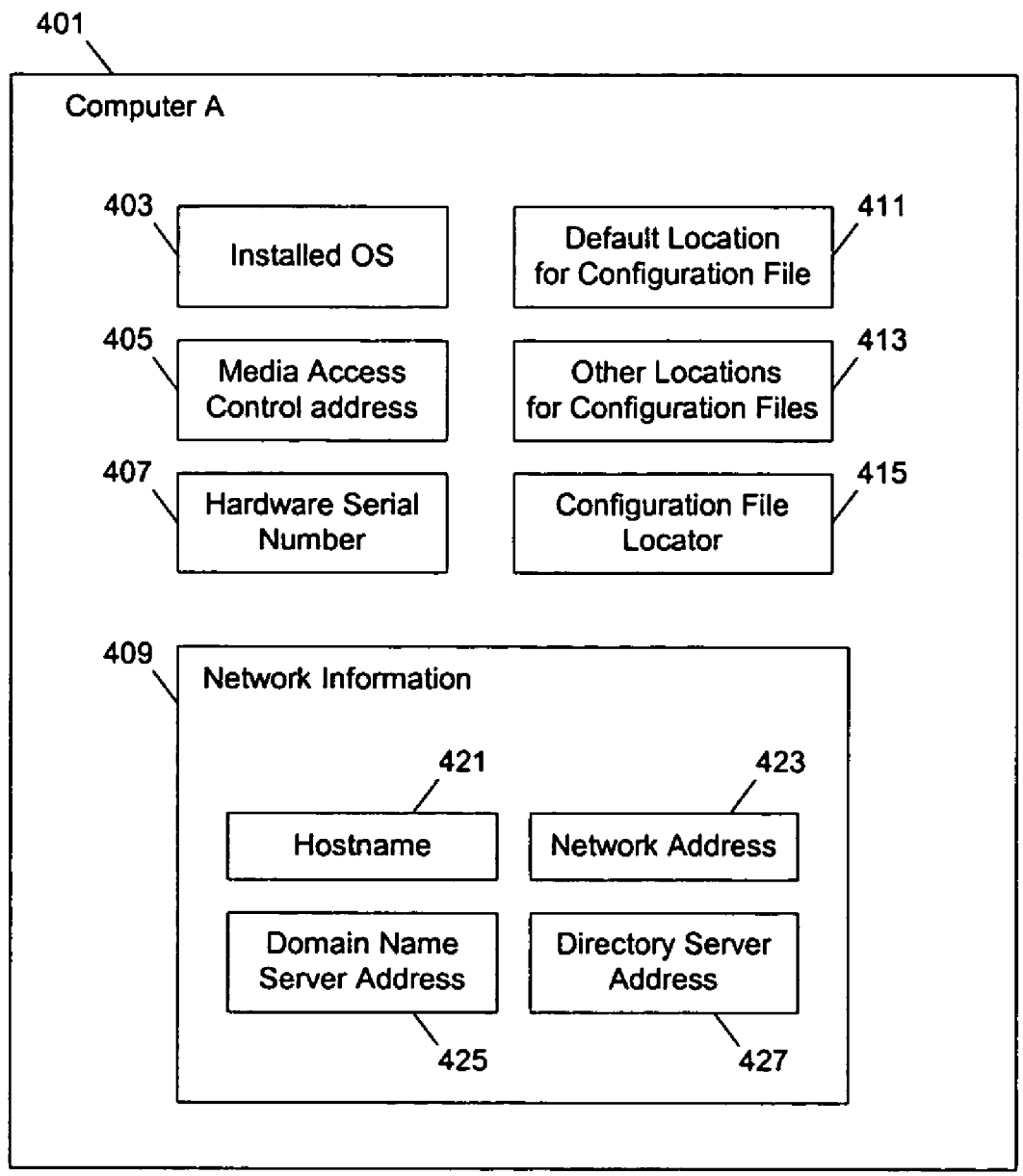
FIG. 4 illustrates software components and data for automatically configuring an operating system according to one embodiment of the present invention.

FIG. 4 illustrates software components and data for automatically configuring an operating system according to one embodiment of the present invention. In FIG. 4, computer A (401) contains installed operating system 403 (e.g., installed on a hard drive and at least partially loaded into the memory of computer 401). During the installation, network information 409 (e.g., hostname 421, network address 423, DNS server address 425, and directory server address 427) may be provided to the computer so that when the system is rebooted for initial setup, this information is already available to computer 401. Alternatively, this network information may be collected from configuration files or from a DHCP server after the reboot for initial setup. Computer 401 may have hardware serial number 407 (e.g., stored in a ROM of computer 401). Further, a network interface device of computer 401 has a Media Access Control (MAC) address 405 that may be used to uniquely identify the computer. In computer 401, default location 411 (e.g., "/Auto Server Setup/") is designated for the storage of the configuration information that will be used to complete the initial setup process. Once configuration information is available at the default location (e.g., in an unencrypted format), the system automatically configures the operating system. In one embodiment of the present invention, configuration files can also be stored at other locations 413 (e.g., the topmost level directory "Auto Server Setup" in at least one of the mounted file volumes). Configuration file locator 415 automatically searches in various locations to find configuration information suitable for setting up the installed operating system 403.

Figure 5:
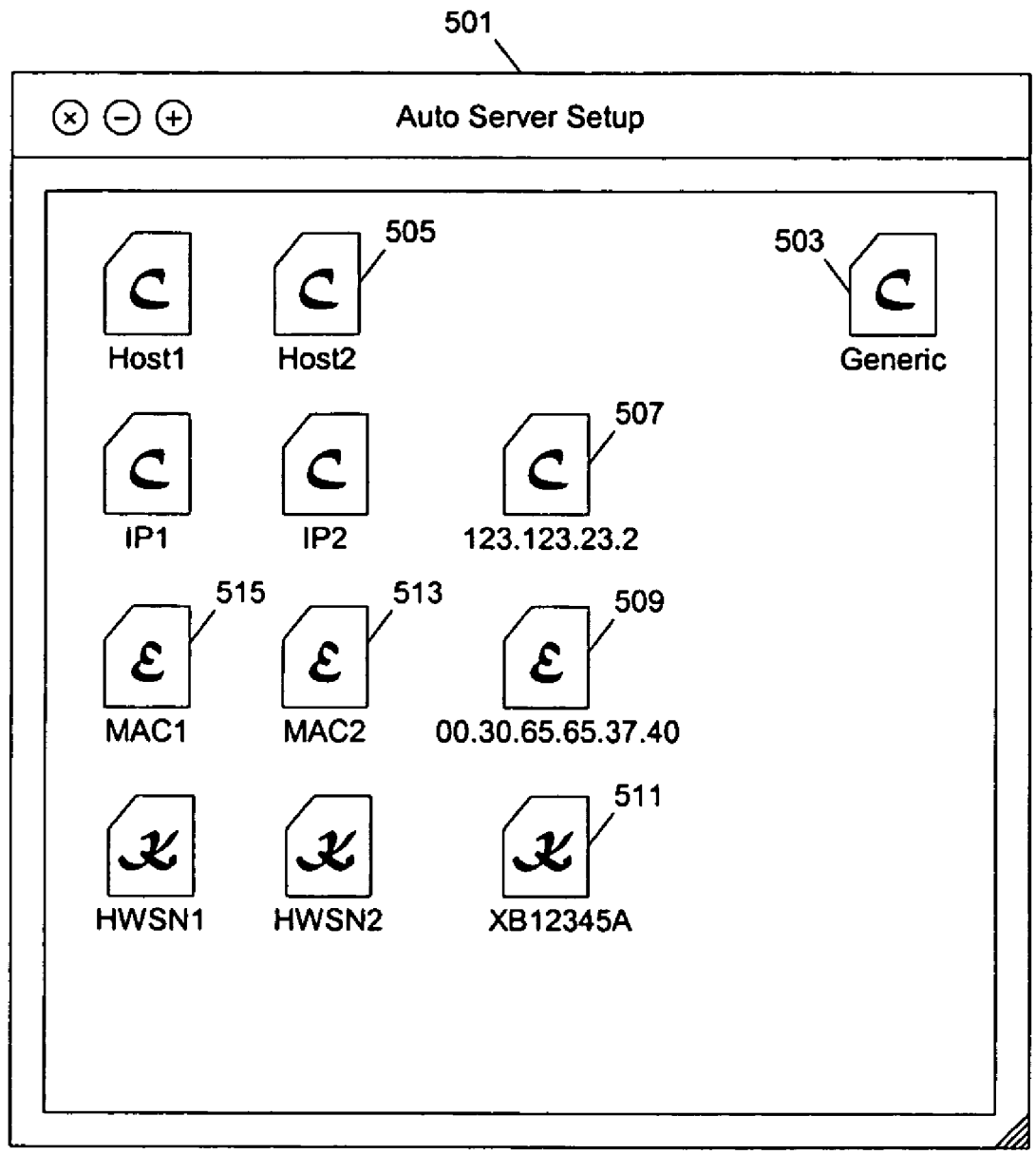
FIG. 5 illustrates configuration files in one location of a data processing system which may be searched for automatic setup according to one embodiment of the present invention.

FIG. 5 illustrates configuration files in one location of a data processing system which may be searched for automatic setup according to one embodiment of the present invention. For example, directory (or folder) 501 may be in the topmost level of a removable media. A computer may have a network interface device with a MAC address of 003065653740. An encrypted configuration file 003065653740.plist (509) can be used to store the configuration information for the compute with the MAC address of 003065653740. Configuration information for computers with other MAC addresses can also be stored in files 513 and 514 named with the corresponding MAC addresses. Thus, a computer in need of configuration information can select the configuration files according to its corresponding identifications. Decryption keys are typically provided separately from the corresponding encrypted configuration files (and are typically located in different locations). For example, the encryption key for the computer with the hardware serial number XB12345ABCD can be stored in file XB12345A.pass (511), and the corresponding encrypted configuration information may be stored on a directory server. Note that in this example only the first 8 characters of the hardware serial number is used to name the configuration file. Further, the configuration files may be stored in files named with the IP addresses or hostnames of the corresponding computers (e.g., files 505 and 507). The configuration file "generic.plist" (503) matches any computer. Thus, the file 503 can be used to store configuration information common to a large number of computers. In FIG. 5, the extensions of the files are not shown. It is understood that the extensions of files may be shown or may be hidden. Files can have the same name but different extensions. For example, the encryption key may be saved in XB12345A.pass and the encrypted configuration information may be stored in XB12345A.plist.

The IP address and the hostname of a computer may be obtained from a DHCP server (e.g., according to the MAC address of the computer). Alternatively, the network information (e.g., IP address, subnet mask, hostname, default gateway, DNS server address, directory server address, and others) can also be specified in a separate configuration file (e.g., in "003065653740.plist" for a network device with the MAC address of 003065653740). After configuration file locator finds the configuration file with the network information (e.g., "003065653740.plist"), the network interface device with the corresponding MAC address (e.g., 003065653740) can be configured for Internet access, and the corresponding IP address and hostname can be further used in the search for additional configuration information.

FIG. 5 illustrates the naming of configuration files in a file volume. Similarly naming schemes can also be used for entries on a directory server when the configuration files are stored as entries on the directory server.

To prevent tampering with the configuration process, the configuration file locator may request that the configuration file found in less trustworthy locations (e.g., directory server, a remote file system, a remote database) be authenticated against keys found in trusted locations (e.g., a local file system, such as a file on a removable storage device or a file on a hard drive). For example, the encrypted configuration information available at a remote computer (e.g., a directory server) must be successfully decrypted with a decryption key provided through a secure channel (e.g., from a file on a local hard drive or a locally attached removable storage media) before the information can be used.

Figure 6:
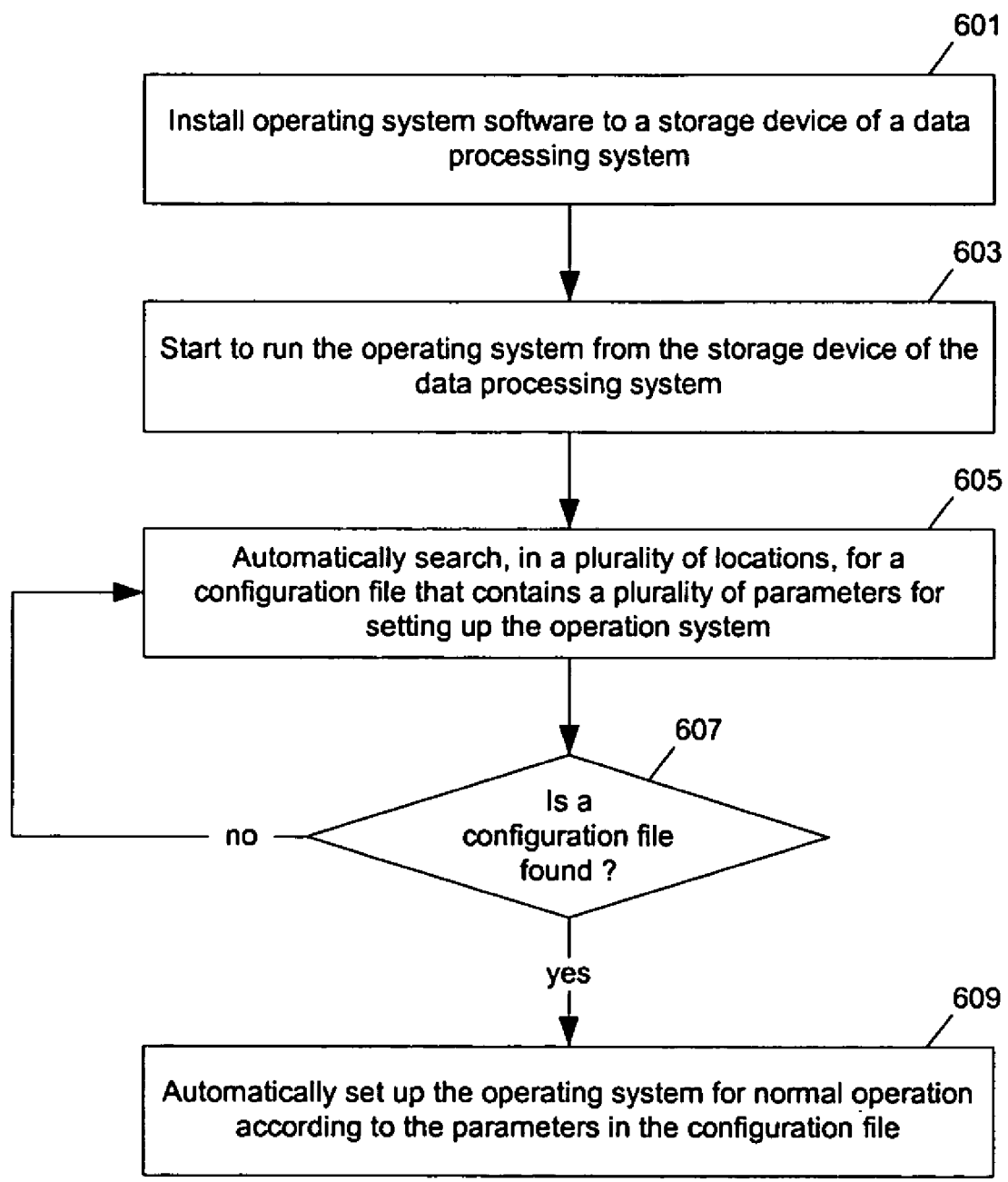
FIG. 6 shows a flow diagram of a method to automatically configure an operating system according to one embodiment of the present invention.

FIG. 6 shows a flow diagram of a method to automatically configure an operating system according to one embodiment of the present invention. After operation 601 installs operating system software to a storage device of a data processing system, operation 603 starts to run the operating system from the storage device of the data processing system. Since the operating system needs an initial setup, operation 605 automatically searches, in a plurality of locations, for a configuration file that contains a plurality of parameters for setting up the operating system. If a configuration file is found for setting up the operating system in operation 607, operation 609 automatically sets up the operating system for normal operation according to the parameters in the configuration file. The search for the configuration file continues until a configuration file becomes available (e.g., after a configuration file is supplied on a removable media, or after a configuration file is created by an interactive setup assistant program, or after a configuration file is obtained from a remote location through network).

Figure 7:
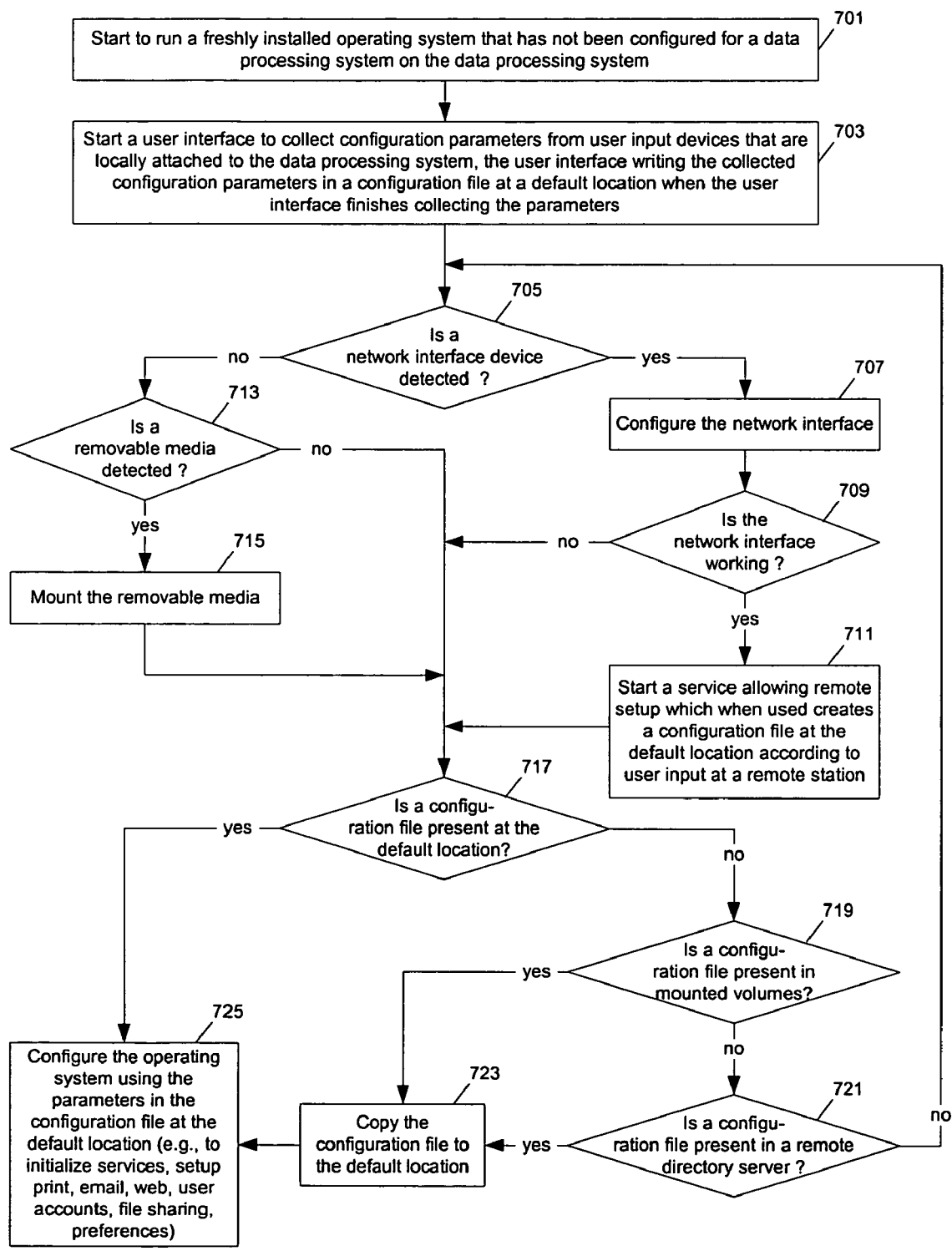
FIG. 7 shows a detailed flow diagram of a method to automatically configure an operating system according to one embodiment of the present invention.

FIG. 7 shows a detailed flow diagram of a method to automatically configure an operating system according to one embodiment of the present invention. Operation 701 starts to run on a data processing system a freshly installed operating system that has not been configured for the data processing system. Operation 703 starts a user interface to collect configuration parameters from user input devices that are locally attached to the data processing system. The user interface writes the collected configuration parameters in a configuration file at a default location when the user interface finishes collecting the parameters. In one embodiment, the user interface is started regardless if the user input devices are attached to the system. Alternatively, the user interface is not started if there are no user input devices (e.g., display, or keyboard and mouse) locally attached to the data processing system. Further, in one embodiment, the user interface may be automatically terminated if there is no user input for a period of time, even if the data processing system has locally attached user input devices. If operation 705 detects a network interface device, operation 707 configures the network interface. Note that the network interface may be a removable network interface card (e.g., a PCMCIA network card, or a based network interface device attachable to a USB port or an IEEE-1394 port). The network interface device may be configured through a DHCP server or through configuration parameters available on the data processing system (e.g., through the installation process of the operating system, or found in a configuration file). If operation 709 determines that the network interface is working, operation 711 starts a service allowing remote setup which when used creates a configuration file at the default location according to user input at a remote station. It is understood that the remote setup may be performed without having to configure certain aspects of the network device. For example, the remote setup service may use TCP/IP protocol but not limited to TCP/IP protocol. Thus, it is not necessary to set up IP address for the network interface device to have a working network interface. For example, the remote setup service may use communication protocols that are not limited to IP addressing. If a removable medium is detected in operation 713, operation 715 automatically mounts the removable media so that one or more predetermined locations on the removable media may also be searched for configuration information. If operation 717 determines that no configuration file is present at the default location (or not all configuration information is available at the default location), operation 719 searches predetermined locations in all mounted volumes for configuration information. If a configuration file is found in operation 719, operation 723 copies the configuration file to the default location. Otherwise, operation 721 further queries a remote directory server for a configuration file. The directory server may store an entire configuration file as one record (e.g., in an encoded and encrypted format). After the configuration information is available at the default location, operation 725 configures the operating system using the parameters in the configuration file at the default location (e.g., to initialize services, setup print, email, web, user accounts, file sharing, preferences).

Although FIGS. 6 and 7 are illustrated with specific sequences of operations, it is understood that different sequences can also be used. For example, some of the operations may be driven by related events, and some of the operations may be performed in different threads or processes. For example, detecting removable network interface devices and removable media can be in a separate process and driven by the event of attaching the devices, and searching the configuration file may be in another separate process, which periodically searches various locations.

Although the above examples are for the initial setup of an operating system after the installation of the operation system, it is understood that the methods according to various embodiments the present invention can also be used for the automatic setup of other software applications. For example, configuration information for a software application (e.g., a multimedia program) can be stored on a database (e.g., a directory server) so that the configuration process after the reinstallation of the software application (e.g., after the reinstallation of the entire computer system) can be automated. Further, the configuration information can be used for software program upgrade and migration (e.g., moving from one computer to another). Further, the database of the configuration information can have a version control so that when the updated configuration information is loaded into the database, a daemon process can automatically discover the updated configuration information and cause the corresponding software application to be configured according to the updated configuration information.

Since the system can automatically search and discover the configuration setup data, the need for time-consuming data entry through interactive user interface can be eliminated, and the time from installation to up-and-usable can be shortened. Administrators can save setup data on local hard drives, shared storage, CDs, IEEE 1394 compatible drives, iPods, Flashcard memory, and other storage devices that can be attached to the system. Further, setup data can be stored in a database, such as a directory server. The setup configuration data can be stored as clear data or as encrypted data. Thus, embodiments of the present invention provide administrators with a great deal of flexibility in managing and organizing the configuration for one or more systems.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable storage medium containing executable computer program instructions which when executed by a data processing system cause said system to perform a method to set up software installed on a storage device of the data processing system, the method comprising:

automatically searching in a plurality of locations for a configuration information that includes one or more parameters to configure the software that includes determining whether a first portion of the configuration information is at a first location based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; continuing the searching in one or more second locations for a second portion of the configuration information based on a second identification of the data processing system; and configuring the software installed on the storage device of the data processing system for operation of the data processing system according to the one or more parameters contained in the configuration information found in at least one of the plurality of locations.

2. The medium of claim 1, wherein the configuration information comprises:

a decryption key; and encrypted configuration information decryptable with the decryption key.

3. The medium of claim 2, wherein the decryption key and the encrypted configuration information are found in different locations of the plurality of locations.

4. A machine readable storage medium containing executable computer program instructions which when executed by a data processing system cause said system to perform a method to set up software installed on a storage device of the data processing system, the method comprising:

searching in a plurality of locations for a configuration information that includes one or more parameters to configure the software, wherein the searching includes determining whether the configuration information is in a first location of the plurality of locations based on a first identification data of the data processing system and wherein the searching in a second location of the plurality of locations is based on a second identification of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP")

address, a hostname, a hardware address, or any combination thereof, and the second identifications include a subnet mask, a generic identification associated with a plurality of data processing systems, or any combination thereof; and configuring the software installed on the storage device of the data processing system for operation of the data processing system according to the one or more parameters contained in the configuration information found in at least one of the plurality of locations, wherein the plurality of locations comprise one default location on a storage device attached fixedly and locally to the data processing system, and wherein the searching is performed automatically in response to installing the software.

5. The medium of claim 4, wherein the plurality of locations further comprise one location in a removable medium locally attached to the data processing system.

6. The medium of claim 4, wherein the plurality of locations further comprise a remote location accessible to the data processing system through a network connection.

7. The medium of claim 1, wherein the software is a portion of an operating system of the data processing system.

8. The medium of claim 1, further comprising:
determining a plurality of identifications of the data processing system;
wherein said searching uses the plurality of identifications to find configuration information suitable for the data processing system.

9. The medium of claim 8, wherein the plurality of identifications comprise one of:
a) a network address of the data processing system;
b) a hostname of the data processing system;
c) a hardware serial number of the data processing system; and
d) a hardware address of a network interface device of the data processing system.

10. The medium of claim 8, wherein the plurality of identifications comprise one identification that matches any data processing system.

11. A machine readable storage medium containing executable computer program instructions which when executed by a data processing system cause said system to perform a method to set up software for the data processing system, the method comprising:
querying a directory server to obtain a configuration information that includes one or more parameters to configure the software, wherein the querying includes determining whether a first portion of the configuration information is at the directory server based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; continuing searching in one or more other locations for a second portion of the configuration information based on a second identification of the data processing system; and configuring the software for operation of the data processing system according to the one or more parameters contained in the configuration information obtained from the directory server.

12. The medium of claim 11, wherein the software is a portion of an operating system of the data processing system.

13. The medium of claim 12, further comprising:
automatically obtaining a network address and an address of the directory server from a server on a local area network; and
configuring a network interface device of the data processing system to use the network address;
wherein said querying uses the address of the directory server and the network interface device which is configured to use the network address.

14. The medium of claim 12, wherein the configuration information comprises one of:
a) user account information;
b) time zone information;
c) keyboard information; and
d) a default language.

15. The medium of claim 12, wherein the configuration information comprises information specifying whether one or more services of the operating system shall be provided on the data processing system.

16. The medium of claim 11, wherein the configuration information comprises a license key for the software.

17. A machine readable storage medium containing executable computer program instructions which when executed by a data processing system cause said system to perform a method to set up software installed on the data processing system, the method comprising:
automatically searching for encrypted configuration information that includes one or more parameters to configure the software that includes determining whether a first portion the encrypted configuration information is at a first location based on a first identification data of the data processing system; continuing the searching in one or more second locations for a second portion of the encrypted configuration information based on a second identification of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and
determining a decryption key to decrypt the encrypted configuration information; and
configuring the software installed on the data processing system using the decryption key and the encrypted configuration information according to the one or more parameters contained in the encrypted configuration information.

18. The medium of claim 17, wherein the decryption key is communicated from a remote data processing system to the data processing system, and the decryption key is not stored on a file system of the data processing system.

19. The medium of claim 17, wherein said determining the decryption key comprises searching in a plurality of locations.

20. The medium of claim 19, wherein the plurality of locations comprise one of:
  a) a removable storage device locally attached to the data processing system;
  b) a predetermined location in a file volume in a file system of the data processing system; and
  c) a database on a remote data processing system accessible to the data processing system through a network connection.

21. A method to set up software installed on a storage device of a data processing system, the method comprising:
  automatically searching in a plurality of locations for configuration information that includes one or more parameters to configure the software that includes determining whether a first portion of the configuration information is at a first location based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; continuing the searching in one or more second locations for a second portion of the configuration information based on a second identification of the data processing system; and
  configuring the software installed on the storage device of the data processing system for operation of the data processing system according to the one or more parameters contained in the configuration information found in at least one of the plurality of locations.

22. The method of claim 21, wherein the software is a portion of an operating system of the data processing system.

23. The method of claim 21, wherein the plurality of locations are periodically searched.

24. A method to set up software installed on a storage device of a data processing system, the method comprising:
  searching in a plurality of locations for configuration information that includes one or more parameters to configure the software, wherein the searching includes determining whether the configuration information is in a first location of the plurality of locations based on a first identification data of the data processing system and wherein the searching in a second location of the plurality of locations is based on a second identification of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and
  configuring the software installed on the storage device of the data processing system for operation of the data processing system according to the one or more parameters contained in the configuration information found in at least one of the plurality of locations, wherein the plurality of locations comprise one default location on a storage device attached fixedly and locally to the data processing system, and wherein the searching is performed automatically in response to installing the software.

25. The method of claim 24, wherein the plurality of locations further comprise one of:
  location in a removable medium locally attached to the data processing system; and
  a directory server.

26. A method to set up software for a data processing system, the method comprising:
  querying a directory server to obtain a configuration information that includes one or more parameters to configure the software, wherein the querying includes determining whether a first portion of the configuration information is at the directory server based on a first identification data of the data processing system; and continuing searching in one or more other locations for a second portion of the configuration information based on a second identification of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and
  configuring the software for operation of the data processing system according to the one or more parameters contained in the configuration information obtained from the directory server.

27. The method of claim 26, wherein the software is a portion of an operating system of the data processing system.

28. The method of claim 27, further comprising:
  automatically obtaining a network address and an address of the directory server from a server on a local area network; and
  configuring a network interface device of the data processing system to use the network address;
  wherein said querying uses the address of the directory server and the network interface device which is configured to use the network address.

29. The method of claim 27, wherein the configuration information comprises information specifying whether one or more services of the operating system shall be provided on the data processing system.

30. A method to set up software installed on a data processing system, the method comprising:

automatically searching for encrypted configuration information that includes one or more parameters to configure the software that includes determining whether a first portion of the encrypted configuration information is at a first location based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and continuing the searching in one or more second locations for a second portion of the encrypted configuration information based on a second identification of the data processing system;

determining a decryption key to decrypt the encrypted configuration information; and configuring the software installed on the data processing system for operation using the decryption key and the encrypted configuration information according to the one or more parameters contained in the encrypted configuration information.

31. The method of claim 30, wherein said determining the decryption key comprises searching in a plurality of locations.

32. A data processing system to set up software installed on a storage device of the data processing system, the data processing system comprising: a memory;

means for automatically searching in a plurality of locations for a configuration information that includes one or more parameters to configure the software that includes means for determining whether a first portion of the configuration information is at a first location based on a first identification data of the data processing system; and means for continuing the searching in one or more second locations for a second portion of the configuration information based on a second identification of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and means for configuring the software installed on the storage device of the data processing system for operation according to the one or more parameters contained in the configuration information found in at least one of the plurality of locations.

33. The data processing system of claim 32, wherein the software is a portion of an operating system of the data processing system.

34. A data processing system to set up software, the data processing system comprising: a memory;

means for querying a directory server to obtain a configuration information that includes one or more parameters to configure the software, wherein the means for querying includes means for determining whether a first portion of the configuration information is at the directory server based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; means for continuing searching in one or more other locations for a second portion of the configuration information based on a second identification of the data processing system; and means for configuring the software for operation of the data processing system according to the one or more parameters contained in the configuration information obtained from the directory server.

35. The data processing system of claim 34, wherein the software is a portion of an operating system of the data processing system.

36. The data processing system of claim 35, further comprising:

means for automatically obtaining a network address and an address of the directory server from a server on a local area network; and means for configuring a network interface device of the data processing system to use the network address;

wherein said means for querying uses the address of the directory server and the network interface device which is configured to use the network address.

37. The data processing system of claim 35, wherein the configuration information comprises information specifying whether one or more services of the operating system shall be provided on the data processing system, and the one or more services comprise one of:

a) email;
b) printer;
c) firewall;
d) web;
e) password;
f) multimedia stream; and
g) file sharing.

38. A data processing system to set up software, the data processing system comprising: a memory;
  means for automatically searching for an encrypted configuration information that includes one or more parameters to configure the software that includes means for determining whether a first portion of the encrypted configuration information is at a first location based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and means for continuing the searching in one or more second locations for a second portion of the encrypted configuration information based on a first identification of the data processing system;
  means for determining a decryption key to decrypt the encrypted configuration information; and
  means for configuring the software installed on the data processing system using the decryption key and the encrypted configuration information according to the one or more parameters contained within the encrypted configuration information.

39. The data processing system of claim 38, wherein the decryption key is communicated from a remote data processing system to the data processing system.

40. A data processing system, comprising:
  memory including a storage device, the storage device having installed software;
  a processor coupled to the memory, the processor automatically searching in a plurality of locations for a configuration information that includes one or more parameters to configure the software, wherein the automatically searching includes determining whether a first portion of the configuration information is at a first location based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and continuing the searching in one or more second locations for a second portion of the configuration information based on a second identification of the data processing system, the processor configuring the software installed on the storage device for operation according to the one or more parameters contained in the configuration information found in at least one of the plurality of locations.

41. The data processing system of claim 40, wherein the software is a portion of an operating system of the data processing system.

42. A data processing system, comprising:
  memory storing software;
  a network interface device;
  a processor coupled to the memory and the network interface device, the processor querying a directory server using the network interface to obtain a configuration information that includes one or more parameters to configure the software, wherein the querying includes determining whether a first portion of the configuration information is at the directory server based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and continuing searching in one or more other locations for a second portion of the configuration information based on a second identification of the data processing system, the processor configuring the software stored in the memory for operation of the data processing system according to the one or more parameters contained in the configuration information obtained from the directory server.

43. The data processing system of claim 42, wherein the software is a portion of an operating system of the data processing system.

44. A data processing system, comprising:
  memory storing software;
  a processor coupled to the memory, the processor automatically searching for an encrypted configuration information that includes one or more parameters to configure the software, wherein the automatically searching includes determining whether a first portion of the encrypted configuration information is at a first location based on a first identification data of the data processing system, wherein the first identification data include first identifications that are unique to the data processing system and second identifications that are not unique to the data processing system, wherein the second identifications have lower priorities than the first identifications in the searching, wherein the configuration information associated with the first identifications is configured to overwrite at least a portion of the configuration information associated with the second identifications, wherein the first identifications include a hardware serial number, an Internet Protocol ("IP") address, a hostname, a hardware address, or any combination thereof, and the second identifications include a subnet mask, a generic identification associated with a plurality of data processing systems, or any combination thereof; and continuing the searching in one or more second locations for a second portion of the encrypted configuration information based on a second identification of the data processing system, the processor determining a decryption key to decrypt the encrypted configuration information, the processor configuring the software installed on the memory for operation of the data processing system using the decryption key and the encrypted configuration information according to the one or more parameters.

45. The data processing system of claim 44, wherein the processor searches in a plurality of locations to determine the decryption key, and the plurality of locations comprise one of:

a) a removable storage device locally attached to the data processing system;

b) a predetermined location in a file volume in a file system of the data processing system; and c) a database on a remote data processing system accessible to the data processing system through a network connection.

* * * * *

UNITED STATES PATENT AND TRADEMARK OFFICE
CERTIFICATE OF CORRECTION

| | |
|---|---|
| PATENT NO. | : 7,774,774 B1 |
| APPLICATION NO. | : 10/691993 |
| DATED | : August 10, 2010 |
| INVENTOR(S) | : J. Scott Mulligan et al. |

It is certified that error appears in the above-identified patent and that said Letters Patent is hereby corrected as shown below:

In column 9, line 52, delete "similar-style" and insert -- similar Unix-style --, therefor.

In column 16, line 38, in claim 17, delete "portion the" and insert -- portion of the --, therefor.

Signed and Sealed this
Twenty-second Day of November, 2011

David J. Kappos
*Director of the United States Patent and Trademark Office*